Patented Oct. 30, 1934

1,978,783

UNITED STATES PATENT OFFICE 1,978,783

AZO DYESTUFFS

Miles Augustinus Dahlen, Wilmington, Del., assignor to E. I. du Pont de Nemours & Company, Wilmington, Del., a corporation of Delaware No Drawing. Application December 8, 1931, Serial No. 579,831

20 Claims. (Cl. 260—76)

This invention relates to new chemical compounds and processes for their manufacture. More particularly, the invention relates to chemical compounds containing the radical having the following probable formula:

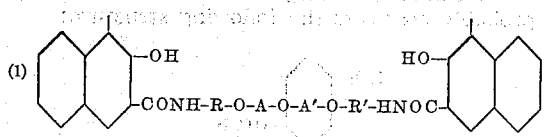

in which R and R' represent benzene nuclei which are free from substituent groups that would render the compound water-soluble and which may contain halogen, alkyl, and alkoxy substituents, and A and A' represent alkylene groups containing at least two carbon atoms. It especially contemplates azo dyes falling in the above class of compounds.

It is an object of the invention to produce new chemical compounds which are insoluble in water. Further objects are the production of new pigments, new azo dyes which yield fast dyeings and printings on the fiber and in general to advance the art. Other objects will appear hereinafter.

These objects are accomplished by producing compounds having the following probable formula:

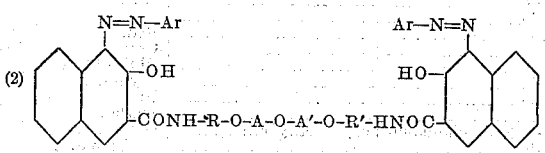

wherein Ar represents a carbocyclic or heterocyclic aromatic radical, preferably a member of the benzene, diphenyl, naphthalene, anthracene or carbazole series, which contains no group or groups that would render the compound water soluble, such as, for example, the sulfonic or carboxylic group; R and R' represent benzene nuclei which are free from groups that would make the compound water soluble and which may or may not contain substituents selected from the group halogen, alkyl, and alkoxy; A and A' represent alkylene groups containing at least two carbon atoms. R and R' may be alike or different. The same is true of A and A'. These compounds are obtained by coupling the arylamides having the formula:

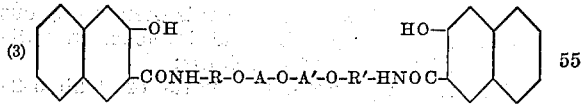

(which are described in my copending United States application Serial No. 438,913) with diazotized aromatic amines free from groups that would render the compound water soluble, R, R', A and A' in the above formula having the same significance as in formula (2). The coupling may be effected in the usual ways, e. g., in aqueous solution or in suspension or on the fiber.

While the invention is susceptible of considerable variation and modification in the manner of its practical application, the following examples will illustrate some of the products falling within the invention and how they may be prepared. The proportions are given in parts by weight.

Example I

Well boiled and dried cotton yarn is impregnated with a solution containing per liter, 10 parts of Turkey red oil, 10 parts of caustic soda of 40 per cent strength, and 5 parts of the di- (2 : 3 - hydroxy - naphthoyl) - beta : beta' - di - (para - chloro - ortho - amino - phenoxy) - di - ethyl ether. The yarn thus treated is well wrung out, rinsed, and, without being dried, developed with a diazo solution of meta-chloro-aniline. The diazo solution is prepared as follows:

Twelve and seven-tenths parts of meta-chloroaniline are dissolved in a mixture of 30 parts of boiling water and 30 parts of hydrochloric acid of 20° Bé. strength. To this mixture, 140 parts of cold water and 150 parts of ice are then added. When the resultant mixture has cooled sufficiently, a solution of 7.5 parts of sodium nitrite dissolved in 30 parts of water is slowly added. When the diazotization is complete, the solution is diluted to a volume equivalent to about 500 parts of water with cold water, and 20 parts of sodium acetate are added to neutralize the mineral acidity.

After the development of the color is complete, the yarn is removed from the developing bath and washed with water and then with a soap solution to remove excess arylamide and diazo-salt, as well as to remove any developed dye not firmly fixed to the fiber.

By the above process, an orange dyeing of good fastness to light and hot soaping is obtained.

The dye probably possesses the following formula:

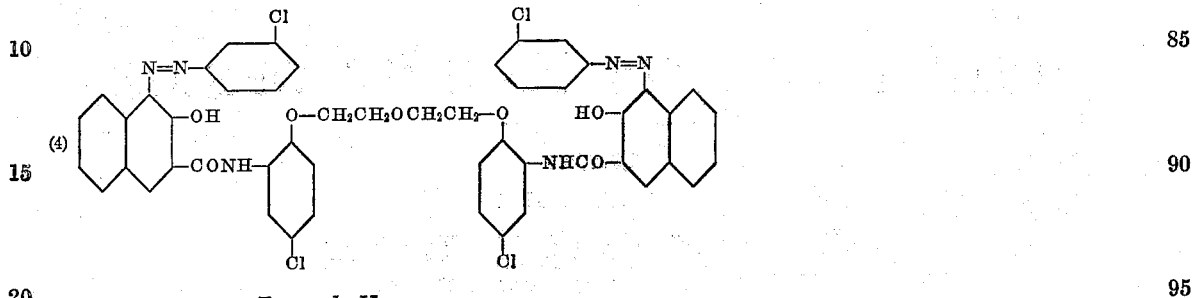

(4)

Example II

Well boiled and dried cotton yarn is impregnated with an aqueous grounding liquor containing in one liter 20 parts of Turkey red oil, 10 parts of caustic soda of 40 per cent strength and 5 parts of the di - (2 : 3 - hydroxy - naphthoyl) - beta : beta' - di - (para - amino - phenoxy) - di - ethyl ether. The treated yarn is then wrung out as thoroughly as possible and developed in a diazo solution prepared as follows:

Sixteen and eight-tenth parts of 4-nitro-2-amino-anisole are dissolved in 200 parts of boiling water containing 30 parts of hydrochloric acid of 22° Bé. strength. The solution is cooled, 150 parts of ice added, and 7.2 parts of sodium nitrite dissolved in 50 parts of water then introduced, the temperature being held below 10° C. during the diazotization. When the diazotization is complete, as shown by disappearance of free nitrous acid, the solution is diluted to a volume equivalent to 500 parts of water. Sodium acetate is then added until the solution is no longer acid when tested with Congo red papers.

When coupling of the dye is complete in the developing bath, the yarn is removed and washed with water and then with soap solution to remove uncoupled diazo-salt and arylamide, and to remove any dye not thoroughly adhering to the fiber.

By this process, a dyeing of scarlet to red shade is obtained which shows excellent fastness to light, soaping, boiling and chlorine. The dye probably possesses the following structure:

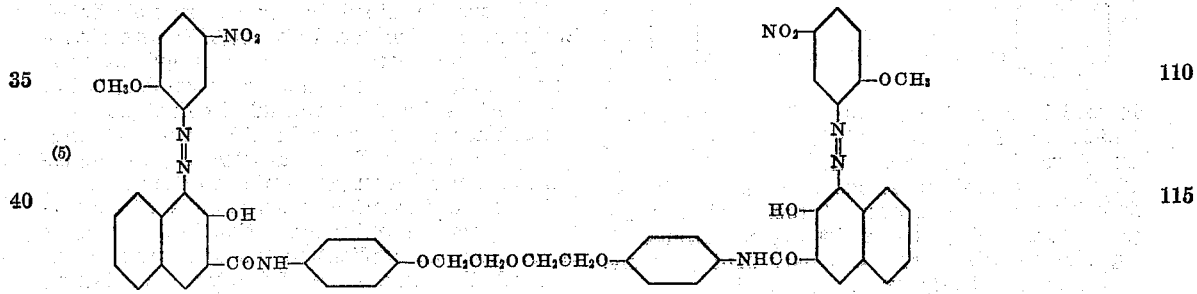

(5)

The following table discloses further combinations of these new arylamides of beta-hydroxy-naphthoic-acid with various suitable diazotized aromatic amines.

| Example No. | Diazo compound from | Coupled with the di-(2:3-hydroxy-naphthoyl)-derivative of | Shade |
| --- | --- | --- | --- |
| 3 | 1-amino-4-benzoylamino-2:5-diethoxy-benzene | β:β'-di-(para-amino-phenoxy)-diethyl-ether | Deep blue. |
| 4 | 3-nitro-4-amino-toluene | do | Scarlet. |
| 5 | 2-nitro-4-chloro-aniline | do | Do. |
| 6 | 5-nitro-2-amino-anisole | do | Red. |
| 7 | Meta-chloro-aniline | do | Orange. |
| 8 | 4:4'-diamino-diphenylamine | do | Bluish-black. |
| 9 | Alpha-naphthylamine | do | Bordeaux. |
| 10 | Alpha-amino-anthraquinone | do | Red. |
| 11 | 2:5-dichloro-aniline | do | Scarlet. |
| 12 | Meta-chloro-aniline | β:β'-di-(ortho-amino-phenoxy)-diethyl-ether | Orange. |
| 13 | 5-nitro-2-amino-anisole | do | Bluish-red. |
| 14 | 4-nitro-2-amino-toluene | do | Scarlet. |
| 15 | 2-nitro-4-chloro-aniline | do | Red. |
| 16 | 2:5-dichloro-aniline | do | Scarlet. |
| 17 | 4-nitro-2-amino-anisole | do | Red. |
| 18 | Dianisidine | do | Blue. |
| 19 | 4:4'-diamino-diphenylamine | do | Bluish-black. |
| 20 | Ortho-ethoxy-benzene-azo-alpha-naphthylamine | do | Do. |
| 21 | 3-nitro-4-amino-toluene-azo-cresidine | do | Corinth. |
| 22 | 1-amino-4-benzoylamino-2:5-dimethoxy-benzene | β:β'-di-(para-chloro-ortho-amino-phenoxy)-diethyl ether. | Blue. |
| 23 | 4-nitro-2-amino-anisole | do | Scarlet. |
| 24 | 2:5-dichloro-aniline | do | Do. |
| 25 | 5-nitro-2-amino-anisole | do | Red. |
| 26 | 3-amino-carbazole | do | Corinth. |
| 27 | 4-nitro-2-amino-anisole | β:β'-di-(para-methyl-ortho-amino-phenoxy)-diethyl ether. | Scarlet. |
| 28 | 3-nitro-4-amino-toluene | do | Red. |
| 29 | 2:5-dichloro-aniline | β:β'-di-(ortho-methoxy-para-amino-phenoxy)-diethyl ether. | Scarlet. |
| 30 | 5-nitro-2-amino-anisole | do | Red. |

In general, azo dyes formed from β:β'-di-(para-amino-phenoxy)-diethyl ether, β:β'-di-(ortho-amino-phenoxy)-diethyl ether, and β:β'-di-(para-chloro-ortho-amino-phenoxy)-diethyl ether are preferred. Dyes prepared as herein described from β:β'-di-(para-amino-phenoxy)-diethyl ether derivatives are particularly advantageous from the standpoint of fastness to light.

The Corinth dyestuff produced according to Example 26 exhibits excellent fastness to light. It has the following probable formula:

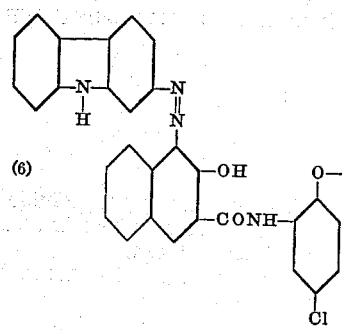 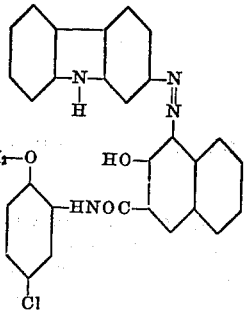

The scarlet dyestuff of Example 27 exhibits good fastness to light. It has the following probable constitution:

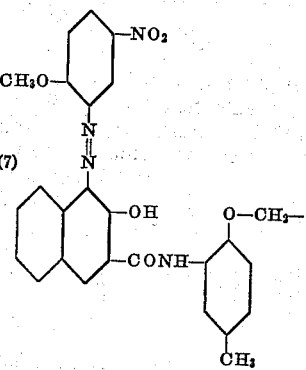 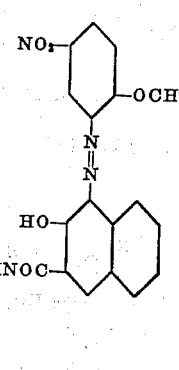

It will be understood that the scope of the invention is not limited by the particular examples set forth above. Other halogens than chlorine, for example, bromine, may be substituted in the various aromatic nuclei of general Formula (2). Similarly, alkyl groups such as ethyl, isopropyl, etc., may be employed in place of methyl groups, and methoxy groups may be replaced by ethoxy or other acyclic ether groups.

Any other diazotizable aromatic amines containing no sulphonic or carboxylic groups or other groups that would render the dye water soluble may be coupled with beta-hydroxy-naphthoic acid arylamides of the type herein described.

Products prepared in accordance with the present invention show unexpected and unpredictable improved properties over dyes and pigments prepared from other arylamides of beta-hydroxy-naphthoic acid, particularly in regard to fastness to washing, boiling, hot soaping, chlorine, light, etc. Moreover, the colors are most desirable from the standpoints of shade and brightness.

As many apparently widely different embodiments of this invention may be made without departing from the spirit thereof, it is to be understood that I do not limit myself to the foregoing examples or description except as indicated in the following patent claims.

I claim:
1. The chemical compound having the general formula:

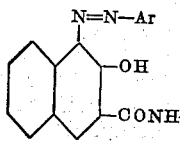 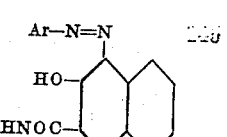

wherein Ar represents an aromatic radical which is free from any group capable of rendering the compound water-soluble, A and A' represent alkylene radicals containing at least two carbon atoms, and R and R' represent radicals of the benzene series containing no groups capable of rendering the compound water-soluble.

2. The chemical compound having the general formula:

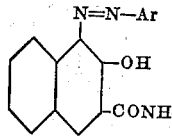 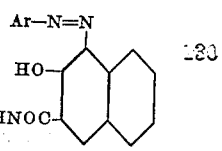

wherein Ar represents an aromatic radical which is free from any group capable of rendering the compound water-soluble, and R and R' represent radicals of the benzene series containing no groups capable of rendering the compound water-soluble.

3. The chemical compound having the general formula:

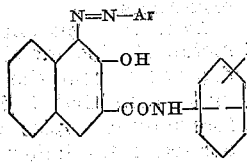
—CONH—R—O—CH₂—CH₂—O—CH₂—CH₂—O—R'—HNOC— wherein Ar represents an aromatic radical of the benzene series which is free from any group capable of rendering the compound water-soluble, and R and R' represent radicals of the benzene series containing no groups capable of rendering the compound water-soluble.

4. The chemical compound having the general formula:

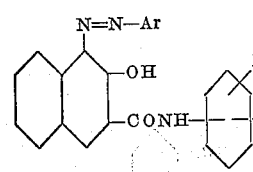
—CONH—☐—O—A—O—A'—O—☐—HNOC— wherein, Ar represents an aromatic radical which is free from any group capable of rendering the compound water soluble, A and A' represent alkylene groups containing at least two carbon atoms, X is a member of the group consisting of halogen, hydrogen, alkyl and alkoxy.

5. The chemical compound having the general formula:

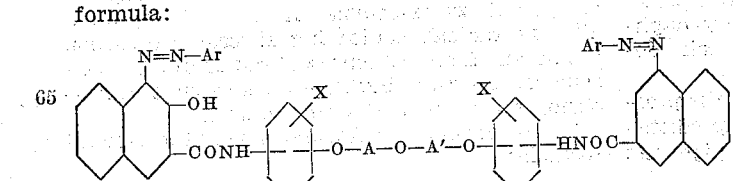

wherein, Ar represents an aromatic radical of the benzene, diphenyl, naphthalene, anthracene, or carbazole series which is free from any group capable of rendering the compound water soluble, A and A' represent alkylene radicals containing at least two carbon atoms and X is a member of the group consisting of halogen, hydrogen, alkyl and alkoxy.

6. The new compound having the general formula:

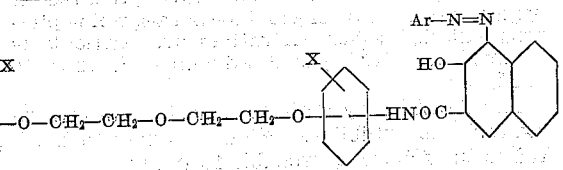

wherein, Ar represents an aromatic radical of the benzene, diphenyl, naphthalene, anthracene, or carbazole series which is free from any group capable of rendering the compound water soluble, and X is a member of the group consisting of halogen, hydrogen, alkyl, and alkoxy.

7. The chemical compound having the general formula:

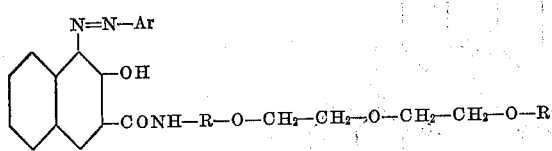
—CONH—☐—O—CH₂—CH₂—O—CH₂—CH₂—O—☐—HNOC— wherein, Ar represents an aromatic radical of the benzene or naphthalene series which is free from any group capable of rendering the compound water soluble and X is a member of the group consisting of halogen, hydrogen, alkyl and alkoxy.

8. A chemical compound having the general formula:

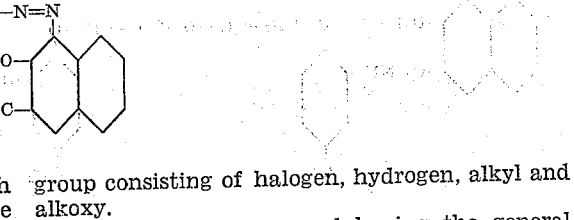

wherein Ar is an aromatic radical, said compound being obtainable by coupling a diazotized aromatic amine which is free from any group that would render the compound water soluble with the condensation product of 2-hydroxy-3-naphthoic acid and β:β'-di-(para-amino-phenoxy)-diethyl ether.

9. The chemical compound having the following formula:

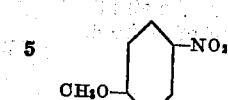
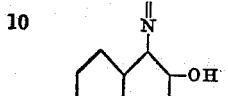
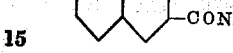

10. The chemical compound having the following formula:

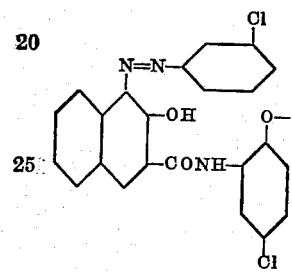
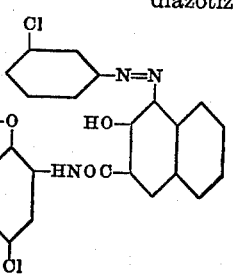

11. The chemical compound having the following formula:

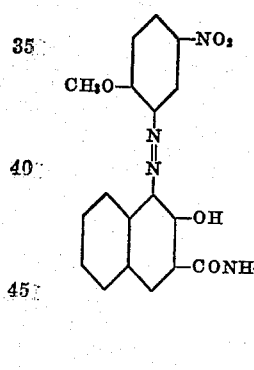
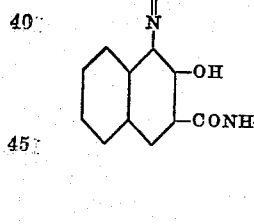

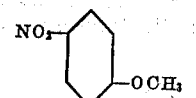
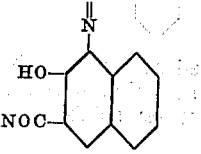

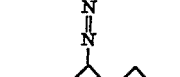
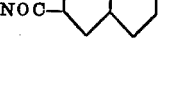

12. The process of producing new chemical compounds which comprises coupling a diazotized aromatic amine which is free from any group capable of rendering the compound water soluble with a compound having the following general formula:

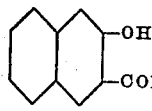CONH—R—O—A—O—A′—O—R′—HNOC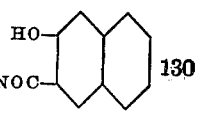

wherein R and R′ are members of the benzene series containing no groups capable of rendering the compound water soluble, and A and A′ are alkylene groups containing at least two carbon atoms.

13. The process which comprises coupling a diazotized aromatic amine, which is free from any group capable of rendering the resultant compound water soluble, to a compound having the following general formula:

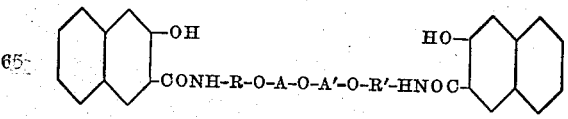

wherein R and R′ are members of the benzene series free from any group capable of rendering the dye water soluble.

14. The process which comprises coupling a diazotized aromatic amine, which is free from any group capable of rendering the resultant compound water soluble, to a compound having the following general formula:

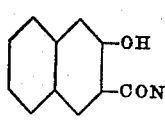CONH—R—O—CH₂—CH₂—O—CH₂—CH₂—O—R′—HNOC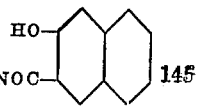

wherein R and R′ are members of the benzene series free from any group capable of rendering the dye water soluble, and contain as substituents one or more members of the group halogen, alkyl, and alkoxy.

15. The process which comprises coupling a compound having the following general formula:

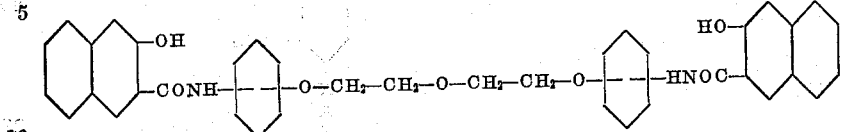

with a diazotized aromatic amine which is free from any group capable of rendering the resultant compound water soluble.

16. Fibers dyed with the dyestuff of claim 1.
17. Fibers dyed with the dyestuff of claim 2.
18. Fibers dyed with the dyestuff of claim 3.
19. Fibers dyed with the dyestuff of claim 4.
20. Fibers dyed with the dyestuff of claim 7.

MILES AUGUSTINUS DAHLEN.